United States Patent [19]

Battista

[11] Patent Number: 5,032,415

[45] Date of Patent: Jul. 16, 1991

[54] PREPARING SHAPED PRODUCT EXPANDABLE IN GASTRIC JUICES AND PRODUCT

[76] Inventor: Orlando A. Battista, 3863 SW. Loop 820, Ste. 100, Fort Worth, Tex. 76133-2076

[21] Appl. No.: 545,708

[22] Filed: Jun. 29, 1990

Related U.S. Application Data

[63] Continuation of Ser. No. 351,590, May 15, 1989, abandoned, which is a continuation of Ser. No. 122,675, Nov. 19, 1987, abandoned.

[51] Int. Cl.$^5$ ................................................ A23L 1/29
[52] U.S. Cl. ...................................... 426/285; 426/615; 426/658
[58] Field of Search ........................ 426/285, 615, 658

[56] References Cited

U.S. PATENT DOCUMENTS

| | | | |
|---|---|---|---|
| 2,978,446 | 4/1961 | Battista et al. | 426/56 |
| 3,023,104 | 2/1962 | Battista | 426/549 |
| 3,821,428 | 6/1974 | Farkas | 426/559 |
| 4,042,719 | 8/1977 | Zimmerman | 426/573 |
| 4,401,682 | 8/1983 | Battista | 426/285 |
| 4,670,251 | 6/1987 | Blanco | 426/583 X |
| 4,680,189 | 7/1987 | Schumacher et al. | 426/285 |
| 4,710,390 | 12/1987 | Schumacher et al. | 426/285 |

*Primary Examiner*—Joseph Golian
*Attorney, Agent, or Firm*—Shoemaker and Mattare, Ltd.

[57] ABSTRACT

There is disclosed novel methods and low caloric, edible products produced thereby comprising the steps of dry mixing, dry ultra pure cellulose and/or colloidal microfibrils dry blended with a combination of dry gums carageenan and guar gum and animal protein. The mixed powders so prepared are compacted under specific compression to provide a hardened but swellable tablet which quickly swells in the stomach juices into a firm gelatinous mass which imparts a feeling of fullness and reduces the appetite by a safe, local non-systemic, expandable bulking mechanism.

5 Claims, No Drawings

PREPARING SHAPED PRODUCT EXPANDABLE IN GASTRIC JUICES AND PRODUCT

This is a continuation of application Ser. No. 351,590, filed May 15, 1989, now abandoned, which is a continuation of Ser. No. 122,675, filed Nov. 19, 1987, now abandoned.

BACKGROUND OF THE INVENTION

This invention relates to new weight-control, substantially zero-calorie compositions comprising dry mixtures of edible cellulose fibers and colloidal cellulose microfibrils, incorporated by dry mixing with a combination of natural acid-swellable gums in dry, particulate form to provide new compositions possessing a water-expandable property such as to grow at least to several times, or more, of their compressed dry volume in an aqueous acidic medium. The above mixtures, when compressed in dry powder forms into tablets and/or granular compositions are capable of swelling in the acid pH of the stomach into a firm, highly-swollen, physical mass or masses that effectively serve to provide a temporary reduction of the appetite by mechanical rather than systemic action while providing up to at least 10 percent of the normal, average, daily requirements of natural fiber.

The medical literature provides abundant evidence that the excessive intake of food and overweightness constitute a serious health problem. Calorie intake above an individual's needs as a result of the excessive consumption of foods damages the heart and the circulatory system, particularly in the case of aged persons, pregnant women, and people suffering from diabetes. Recently, the use of appetite-reducing medicaments has become widespread. However, such drugs act as stimulants to the central nervous system and also to habituation. The side effects of such systemic drugs to control weight have become so serious in recent time that they have come under FDA control. Amphetamines, for example, can no longer be used for weight control except by prescription under a physician's control; they have been removed from over-the-counter sales. Numerous neurological side effects have been noted from the use of other systemic drugs in diet products containing N-propanolamine or its analogs.

Recently a number of attempts have been made to solve this problem by the administration of compositions containing indigestible substances. The use of these compositions leads to the feeling of fullness without causing weight increase. The following additives have been suggested: casein (British Pat. No. 990,523); mixtures of egg-albumin, casein, cellulose-ether, guar gum, agar pectin, carrageenan, and sodium alginate (British Pat. No. 993,308); guar gum (British Pat. Nos. 1,041,600 and 1,106,882); a mixture of soluble polyglucose citrate and insoluble polyglucose (British Pat. No. 1,182,961); microcrystalline cellulose (U.S. Pat. No. 3,023,104); a mixture of 50% of gluten flour, 1-10% of vegetable gums, and 50% of microcrystalline cellulose, peanut-shell, or wood-flour (U.S. Pat. No. 3,023,104); edible cheese (DAS No. 1,442,021); and 5-30% of finely dispersed pure cellulose (DAS No. 1,959,196).

Special dry cakes for diabetic people have also been described, prepared from 100% of soya flour and 30-50% of protein (DAS No. 2,060,797). None of the above products meets in a satisfactory manner the requirements of efficacious expandability, pleasant and permanent consumption, good taste, and easy absorption from the intestinal tract.

Many efforts have been made to use conventional fibrous cellulose as a bulking agent in low-calorie food compositions and in pharmaceuticals. Fibrous cellulose has the advantage, in addition to providing desirable dietary fiber, of providing desired bulk without calories. However, principal effects of this material has been its objectionable texture, lack of significant expansion, and severe restrictions by reduced flowability required for economical, high-speed, tableting manufacture. This characteristic has greatly limited the use of fibrous cellulose both in the field of food technology and in the field of pharmaceutical preparations. When fibrous cellulose has been mixed according to conventional methods with other good ingredients, the fibrous cellulose is usually very noticeable to the taste, is not smooth, has a fibrous or chalky or gritty feel to the tongue and mouth when chewed, and tends to accumulate as an insoluble or residual material in the mouth. As a result, the food compositions themselves have tended to be rendered unpalatable by the addition of fibrous cellulose. Reduction of fibrous cellulose content of such compositions to the point where it is not detectable in the mouth has effectively reduced the proportion of fibrous cellulose to the point where it has no longer been effective as a bulking agent or as a source of significant dietary fiber.

U.S. Pat. No. 4,042,719 disperses fibrous carbohydrates in a solution of cellulose ethers, subsequently drying the gelled mixture up to temperatures as high as 300° C. to increase palatability by masking the fibrous taste of the fibrous carbohydrate.

U.S. Pat. No. 4,401,682 discloses foamed, crosslinked gelatins (10-50%) blended with fibrous celluloses, 30-35% alpha cellulose and 15-20% microcrystalline cellulose, which expand in gastric juice to a gelatinous mass at least 3 times its original volume. Expandability is derived primarily by the compressed, foamed gelatin swelling when ingested and upon coming into contact with the highly acidic gastric juice in the stomach This process requires prefoaming and drying of the foamed gelatin prior to blending with other ingredients. It produces a very low, bulk-density, tablet precursor which leads to difficulties in producing tablets on high-speed tableting machines.

SUMMARY OF THE INVENTION

According to the present invention, there is provided a process for the preparation of compositions comprising all dry-mixable ingredients having substantially zero-calories (less than about 1/10 of a calorie per 0.675 gram tablet), converting the dry mixture into tablets, capsules, granules, or other forms. In no instance, and unlike the prior art, are the ingredients dispersed in a gelled or foamed solution prior to tableting. All ingredients are preblended in dry form prior to the tableting operation; yet they still give expandable, swollen masses holding large volumes of liquid in position in the stomach.

According to an embodiment of the process of the present invention, the non-digestible carbohydrate components are admixed in a finely divided dry state with relatively small amounts of carrageenan and guar gum, optionally in the presence of further minor components such as calcium citrate, flavorings, coloring, and/or lubricants, etc. Ultrafine particle, low bloom, dry gelatin may be added in an amount less than 0.5 percent.

DETAILED DESCRIPTION OF THE INVENTION

The main feature of the present invention is that no significant swelling of the compressed carbohydrate components and protein components occurs until the components reach the stomach. Most importantly, in the stomach, the hydrated, expanded tablet develops integrity in the form of a heavy, liquid, swollen mass. The component most responsible for the triggering of the swelling of the tablet composition is the acidic gastric juices at body temperature and its very high acidity (a pH of about 1) which serves to promote the formation of the expanded mass which contains a cellulose matrix that gives the expanded mass weight and integrity.

The key major non-digestible, non-caloric carbohydrate ingredients of this invention are microcrystalline cellulose, commercially known as AVICEL and produced by the acid hydrolysis of alpha cellulose present in more than about 70% to about 80% by weight, and fibrous alpha cellulose present in about 5% by weight blended with about 8 to about 20% of a blend of dry, fine edible guar gum and carrageenan and about less than 1% animal protein, such as gelatin. For example, these ultrapure GRAS status colloidal powdered celluloses are available from FMC Corporation of Philadelphia, Pa., as grades PH101, PH105, RC581, and/or RC591. The James River Corporation of Berlin, N.H., is a supplier of food-grade, fibrous, alpha celluloses.

Prior to blending and compressing into tablets, granules, or "plugs" of various shapes or into slugs for insertion into capsules and/or for the acceleration of the flow properties for high-speed tableting, the optimum compression varies with each formulation and generally ranges from about 2 to 14 kilograms or more and preferably from 4 to 12 kilograms.

Particulate, fibrous, alpha cellulose, in relatively small percentages (5–10%), is used as one ingredient for the dry-mixed composition. Especially satisfactory food grades of this particulate, fibrous, alpha cellulose, also known as powdered cellulose, are grades SW4U and BW300. These are mechanically disintegrated and purified celluloses generally obtained from primarily alpha cellulose derived from wood pulp. Ninety-nine and five-tenths percent of this material will pass through a 33-micron screen and 99.0 percent will pass through a 33-micron screen. The average fiber length is 21 microns, and the average fiber width is 17 microns. Such relatively fine, powdered celluloses, or equivalent finely powdered celluloses, provide cellulose fibers which may be used in small proportion as an ingredient to provide a fibrous matrix to help hold the hydrated components of the expanded tablets in gastric juices together to form an oyster-like gelatinous mass that exerts its weight against the wall of the relatively empty or completely empty stomach.

The following examples are intended only to further illustrate the invention and are not intended to limit the scope of the invention which is defined by the claims.

EXAMPLE 1

Dry ingredients in the proportions listed in Table 1 were dry blended in a Waring Blender for less than 2 minutes to produce a dry, homogeneous mixture. This mixture was then "granulated" after being "slugged" to increase the bulk density so that the homogenized dry mix could be fed into a conventional high-speed, tableting machine. Compression, on a scale of 2 to 14 kilograms, was 6 kilograms in this Example for oblong tablets having an average weight of 0.675 grams each. Coated and uncoated tablets were prepared.

Uncoated tablets so prepared were white, and their expandability in simulated gastric* was at least 15 times the volume of the original dry tablet.** When swallowed with a glass of water, the surface of each tablet became smooth and soft because the water caused the uncoated surface to swell just sufficiently to lubricate the outer surface of the tablet, facilitating markedly the ease and comfort of swallowing.

TABLE 1

| Dry Ingredient | % By Wt |
|---|---|
| Microcrystalline Cellulose RC581 | 57.10 |
| Microcrystalline Cellulose PH101 | 18.75 |
| Carrageenan UE | 9.50 |
| Guar Gum | 9.50 |
| Alpha Cellulose SW-40 | 4.65 |
| Gelatin (150 Bloom) | 0.25 |
| Calcium Citrate | 0.25 |

*Simulated Gastric Juice Formula: Dissolve 2.0 g NaCl and 3.2 g pepsin (pepsin is optional) in 7.0 ml conc. HCl and sufficient H$_2$O to make 1000 ml. This test solution has a pH of about 1.2.
**Method to Test the Expansivity of a Pill: Place the pill in approximately 25 ml of 37° C. (body temp.) *Simulated Gastric Juice and note initial rate of growth. Place sample in gastric juice for 30 minutes. Note growth and how well the expanded pill holds together.

EXAMPLE 2

This experiment was performed to establish the importance of dry mixing a small proportion of fine, dry, powdered gelatin with alpha cellulose SW40 PRIOR to dry blending with the major dry components. The results revealed that proportions of only 1 percent or less of dry, fine gelatin based on the total weight of the tablet and dry blended with alpha cellulose SW40 were sufficient to give a good product. The data are shown in Table 2.

TABLE 2

| Single Dry Ingredients | Dry Premixed Ingredients Gms | Dry Mixed Pretableting Ingredients % |
|---|---|---|
| Microcrystalline Cellulose RC581 | — | 55.0 |
| Microcrystalline Cellulose PH101 | — | 15.0 |
| Food Grade Carrageenan UE | — | 15.0 |
| Good Grade Guar Gum | — | 10.0 |
| Dry, Preblended SW40 (4.5 gms) + Fine, Powdered Gelatin 150 Bloom (0.5 gms) | 5.0 | 5.0 |

Coated tablets prepared from this dry-mixed formula, when preslugged and converted into elongated, elliptical tablets at pressures of seven kilograms, grew in volume at least 8 times the volume of the original dry-compressed tablet in simulated gastric juice at 37° C. after 30 minutes.

EXAMPLE 3

Using the dry mix pretableting formula in Example 1, Table 1, tablets were prepared using molds of varying shapes - all 0.675 grams in weight and at compressions of 6 kilograms. The results are shown in Table 3. They show that the design of the mold at a fixed compression does have an effect on the volume expansivity of the dry-compressed tablets in our standard simulated gastric juice test.

TABLE 3

| Mold Shape | Tablet Weight Gms | Kilograms of Compression | Volume Expansivity |
| --- | --- | --- | --- |
| Circular | 0.675 | 6 | 18 |
| Elliptical With Tapered Ends | 0.675 | 6 | 10 |
| Elliptical Oblong | 0.675 | 6 | 14 |
| Compressed, Short, Thick Oblong | 0.675 | 6 | 12 |

EXAMPLE 4

Using the dry mix, pretableting formula of Example 1, Table 1, tablets were prepared using a circular mold at varying kilograms of compression. The results, shown in Table 4, demonstrate the role of tablet compression on the rate of volume expansivity with time.

TABLE 4

| Mold Shape | Tablet Weight | Kilograms/ Compression | Expansivity Volume | | |
| --- | --- | --- | --- | --- | --- |
| | | | 5 Mins | 30 Mins | 60 Mins |
| Circular | 0.675 | 2 | 17 | 16 | 18+ |
| Circular | 0.675 | 4 | 15 | 16 | 18+ |
| Circular | 0.675 | 6 | 12 | 15 | 18+ |
| Circular | 0.675 | 8 | 10 | 12 | 18+ |
| Circular | 0.675 | 10 | 6 | 10 | 18+ |

Various changes and modifications may be made in practicing this invention without departing from the spirit and scope thereof; and, therefore, the invention is not limited except as defined in the appended claims.

I claim:

1. A method for the preparation of a low-calorie edible product capable of expanding into a highly swollen aqueous-holding mass that expands within about 30 minutes to at least 5 times its original volume when in contact with the gastric juices of the stomach comprising the step of dry-blending dry compositions of solid particulate edible active ingredients consisting essentially of from more than about 70 percent to about 80 percent by weight of microcrystalline cellulose obtained by the acid hydrolysis of alpha cellulose and a blend of about 5% by weight of a particulate fibrous alpha cellulose and about 8 to about 20 percent by weight of a blend of dry, fine edible powdered guar gum and carrageenan and about less than 1% animal protein wherein the dry compositions are compressed into tablets at a pressure of about 2 to about 14 kilograms per 0.675 gram tablet in a high speed tabletting machine.

2. A method according to claim 1 wherein the animal protein is gelatin.

3. The method of claim 2 wherein the tablets are shaped in circle, elliptical, oblong and round edged, thick rectangular-shaped products.

4. A low calorie, dry-processed shaped article of manufacture produced by the process of claim 1.

5. An article according to claim 2 wherein the animal protein is gelatin.

* * * * *